: US011149971B2

(12) United States Patent
Ignatiev et al.

(10) Patent No.: US 11,149,971 B2
(45) Date of Patent: Oct. 19, 2021

(54) CLIMATE-CONTROL SYSTEM WITH THERMAL STORAGE DEVICE

(71) Applicant: Emerson Climate Technologies, Inc., Sidney, OH (US)

(72) Inventors: Kirill M. Ignatiev, Sidney, OH (US); Wayne R. Warner, Grand Junction, CO (US)

(73) Assignee: Emerson Climate Technologies, Inc., Sidney, OH (US)

( * ) Notice: Subject to any disclaimer, the term of this patent is extended or adjusted under 35 U.S.C. 154(b) by 267 days.

(21) Appl. No.: 16/280,758

(22) Filed: Feb. 20, 2019

(65) Prior Publication Data

US 2019/0264933 A1 Aug. 29, 2019

Related U.S. Application Data

(60) Provisional application No. 62/634,223, filed on Feb. 23, 2018.

(51) Int. Cl.
*F24F 5/00* (2006.01)
*F24F 3/06* (2006.01)
(Continued)

(52) U.S. Cl.
CPC ............ *F24F 5/0017* (2013.01); *F24F 3/065* (2013.01); *F25B 1/10* (2013.01); *F25B 5/02* (2013.01);
(Continued)

(58) Field of Classification Search
CPC .. F25B 5/02; F25B 9/008; F25B 13/00; F25B 2400/0403; F25B 2400/06; F25B 2400/23;
(Continued)

(56) References Cited

U.S. PATENT DOCUMENTS 2,793,506 A 5/1957 Moody
2,911,513 A 11/1959 MacCracken
(Continued)

FOREIGN PATENT DOCUMENTS

CH 703290 A1 12/2011
CN 1385659 A 12/2002
(Continued)

OTHER PUBLICATIONS

Office Action regarding Chinese Patent Application No. 201680066979.X, dated Oct. 18, 2019. Translation provided by Unitalen Attorneys at Law.
(Continued)

*Primary Examiner* — Jianying C Atkisson
*Assistant Examiner* — Miguel A Diaz
(74) *Attorney, Agent, or Firm* — Harness, Dickey & Pierce, P.L.C.

(57) ABSTRACT

A climate-control system includes a working fluid circuit and a storage tank. The working fluid circuit has a first compressor, a first heat exchanger, a second heat exchanger, a flash tank, and a third heat exchanger. The first heat exchanger receives working fluid discharged from the first compressor. The flash tank is disposed downstream the first heat exchanger and includes an inlet and first and second outlets. The first outlet provides working fluid to the third heat exchanger disposed between the flash tank and the first compressor. The second outlet provides working fluid to the first compressor. The storage tank contains phase-change material that is thermally coupled with the second heat exchanger of the working fluid circuit.

21 Claims, 4 Drawing Sheets

(51) Int. Cl.
*F25B 1/10* (2006.01)
*F25B 5/02* (2006.01)
*F25B 9/00* (2006.01)
*F25B 41/39* (2021.01)
*F25B 41/385* (2021.01)
*F25B 13/00* (2006.01)

(52) U.S. Cl.
CPC .............. *F25B 9/008* (2013.01); *F25B 13/00* (2013.01); *F25B 41/385* (2021.01); *F25B 41/39* (2021.01); *F25B 2400/0403* (2013.01); *F25B 2400/06* (2013.01); *F25B 2400/23* (2013.01); *F25B 2400/24* (2013.01)

(58) Field of Classification Search
CPC .......... F25B 2400/24; F25B 2700/2111; F24F 5/0017; F24F 5/0021; F24F 2005/0025; F24F 2005/0028; F24F 2005/0032; F24F 3/065; F24F 11/875
See application file for complete search history.

(56) References Cited

U.S. PATENT DOCUMENTS

| | | | |
|---|---|---|---|
| 3,733,845 A | 5/1973 | Lieberman | |
| 3,782,132 A | 1/1974 | Lohoff | |
| 4,041,724 A | 8/1977 | Gustafsson | |
| 4,119,143 A | 10/1978 | Robinson, Jr. | |
| 4,122,688 A | 10/1978 | Mochizuki et al. | |
| 4,196,595 A | 4/1980 | Shaw | |
| 4,209,998 A | 7/1980 | Shaw | |
| 4,327,560 A | 5/1982 | Leon et al. | |
| 4,380,156 A * | 4/1983 | Ecker ................. | F24D 11/0264 62/235.1 |
| 4,391,104 A | 7/1983 | Wendschlag | |
| 4,532,854 A | 8/1985 | Foster | |
| 4,696,338 A | 9/1987 | Jensen et al. | |
| 4,899,555 A | 2/1990 | Shaw | |
| 4,945,733 A | 8/1990 | LaBrecque | |
| 4,947,655 A | 8/1990 | Shaw | |
| 5,042,268 A | 8/1991 | LaBrecque | |
| 5,095,712 A | 3/1992 | Narreau | |
| 5,103,650 A | 4/1992 | Jaster | |
| 5,235,820 A | 8/1993 | Radermacher et al. | |
| 5,241,829 A | 9/1993 | Irie et al. | |
| 5,261,251 A | 11/1993 | Galiyano | |
| 5,347,831 A | 9/1994 | Kitaguchi et al. | |
| 5,383,339 A | 1/1995 | McCloskey et al. | |
| 5,400,609 A | 3/1995 | Sjoholm et al. | |
| 5,408,836 A | 4/1995 | Sjoholm et al. | |
| 5,410,889 A | 5/1995 | Sjoholm et al. | |
| 5,729,994 A | 3/1998 | Mukaiyama et al. | |
| 5,894,739 A | 4/1999 | Temos | |
| 6,053,715 A | 4/2000 | Hirano et al. | |
| 6,070,421 A | 6/2000 | Petrovich et al. | |
| 6,205,802 B1 | 3/2001 | Drucker et al. | |
| 6,220,337 B1 | 4/2001 | Chen et al. | |
| 6,231,316 B1 | 5/2001 | Wakisaka et al. | |
| 6,629,413 B1 | 10/2003 | Wendt et al. | |
| 6,758,057 B2 | 7/2004 | Vince, II et al. | |
| 7,096,929 B2 | 8/2006 | Clarksean | |
| 7,147,071 B2 | 12/2006 | Gering et al. | |
| 7,240,725 B2 | 7/2007 | Horn et al. | |
| 7,721,562 B2 | 5/2010 | Lifson et al. | |
| 7,874,499 B2 | 1/2011 | Lochtefeld | |
| 8,020,402 B2 | 9/2011 | Pham et al. | |
| 8,091,381 B2 | 1/2012 | Boiarski et al. | |
| 8,181,470 B2 | 5/2012 | Narayanamurthy et al. | |
| 8,528,345 B2 | 9/2013 | Parsonnet et al. | |
| 8,671,703 B2 | 3/2014 | Mitra et al. | |
| 8,713,963 B2 * | 5/2014 | Yanik ................ | F28F 9/0202 62/513 |
| 9,212,834 B2 | 12/2015 | Parsonnet et al. | |
| 9,353,980 B2 | 5/2016 | Ignatiev | |
| 9,441,861 B2 | 9/2016 | Diamond et al. | |
| 9,470,435 B2 | 10/2016 | Hinde et al. | |
| 9,599,377 B2 | 3/2017 | Kato | |
| 9,709,302 B2 * | 7/2017 | Martin ................... | F25B 15/10 |
| 9,863,672 B2 | 1/2018 | Goenka | |
| 9,989,271 B1 | 6/2018 | Becker | |
| 10,036,580 B2 * | 7/2018 | Zha ......................... | F25B 25/00 |
| 10,465,962 B2 | 11/2019 | Ignatiev et al. | |
| 10,598,395 B2 | 3/2020 | Attari et al. | |
| 10,648,714 B2 | 5/2020 | Van Gysel | |
| 10,663,201 B2 * | 5/2020 | Hayes ..................... | F25B 41/39 |
| 10,969,165 B2 | 4/2021 | Saunders et al. | |
| 11,014,427 B2 | 5/2021 | Vehr et al. | |
| 2002/0066278 A1 | 6/2002 | Cho et al. | |
| 2002/0174673 A1 | 11/2002 | Wilkinson | |
| 2002/0187050 A1 | 12/2002 | Narney et al. | |
| 2004/0035122 A1 | 2/2004 | Lifson et al. | |
| 2004/0159119 A1 | 8/2004 | Hu | |
| 2005/0061497 A1 | 3/2005 | Amaral et al. | |
| 2005/0150248 A1 * | 7/2005 | Manole ................... | F25B 25/00 62/513 |
| 2005/0204773 A1 | 9/2005 | Imai et al. | |
| 2005/0235664 A1 | 10/2005 | Pham | |
| 2006/0010904 A1 | 1/2006 | Nieter et al. | |
| 2006/0010907 A1 | 1/2006 | Taras et al. | |
| 2006/0059933 A1 * | 3/2006 | Axakov ............. | B60H 1/32011 62/244 |
| 2008/0034760 A1 | 2/2008 | Narayanamurthy et al. | |
| 2008/0078192 A1 | 4/2008 | Ignatiev et al. | |
| 2008/0078204 A1 | 4/2008 | Ignatiev | |
| 2008/0078542 A1 | 4/2008 | Gering et al. | |
| 2008/0116289 A1 | 5/2008 | Lochtefeld | |
| 2008/0196877 A1 | 8/2008 | Zeigler et al. | |
| 2008/0245505 A1 | 10/2008 | Yamaguchi et al. | |
| 2009/0007589 A1 | 1/2009 | Takegami et al. | |
| 2009/0173336 A1 | 7/2009 | Leifer et al. | |
| 2009/0211732 A1 | 8/2009 | Goenka | |
| 2009/0235678 A1 | 9/2009 | Taras et al. | |
| 2009/0297377 A1 | 12/2009 | Stover et al. | |
| 2010/0071391 A1 | 3/2010 | Lifson et al. | |
| 2010/0077777 A1 | 4/2010 | Lifson et al. | |
| 2010/0083677 A1 | 4/2010 | Lifson et al. | |
| 2010/0083678 A1 | 4/2010 | Lifson et al. | |
| 2010/0115975 A1 | 5/2010 | Mitra et al. | |
| 2010/0132399 A1 * | 6/2010 | Mitra ................... | B60H 1/3228 62/498 |
| 2010/0139298 A1 | 6/2010 | Lifson et al. | |
| 2010/0199694 A1 | 8/2010 | Taras et al. | |
| 2010/0199715 A1 | 8/2010 | Lifson et al. | |
| 2010/0263393 A1 | 10/2010 | Chen et al. | |
| 2010/0287934 A1 | 11/2010 | Glynn et al. | |
| 2011/0023514 A1 * | 2/2011 | Mitra ................... | B60H 1/3228 62/222 |
| 2011/0048041 A1 | 3/2011 | Asprovski et al. | |
| 2011/0094259 A1 | 4/2011 | Lifson et al. | |
| 2011/0113804 A1 | 5/2011 | Chin et al. | |
| 2011/0135509 A1 | 6/2011 | Fields et al. | |
| 2011/0138825 A1 | 6/2011 | Chen et al. | |
| 2011/0139794 A1 | 6/2011 | Pham et al. | |
| 2011/0144944 A1 | 6/2011 | Pham | |
| 2011/0174014 A1 | 7/2011 | Scarcella et al. | |
| 2011/0232890 A9 | 9/2011 | Gering et al. | |
| 2012/0011866 A1 * | 1/2012 | Scarcella ............. | B60H 1/3228 62/79 |
| 2012/0117988 A1 * | 5/2012 | Mitra ..................... | F25B 1/10 62/115 |
| 2012/0167602 A1 | 7/2012 | Taras et al. | |
| 2012/0192579 A1 | 8/2012 | Huff et al. | |
| 2012/0227427 A1 * | 9/2012 | Liu ......................... | F25B 1/10 62/115 |
| 2012/0285185 A1 * | 11/2012 | Huff ..................... | F25B 9/008 62/115 |
| 2012/0318008 A1 | 12/2012 | Liu et al. | |
| 2013/0031934 A1 * | 2/2013 | Huff ..................... | F25B 1/10 62/510 |
| 2013/0075076 A1 | 3/2013 | Agostini et al. | |
| 2013/0263623 A1 | 10/2013 | Lee et al. | |
| 2013/0298593 A1 | 11/2013 | Christensen | |

(56) References Cited

U.S. PATENT DOCUMENTS

| | | | |
|---|---|---|---|
| 2014/0053585 A1* | 2/2014 | Huff | F25B 1/10 62/115 |
| 2014/0151015 A1 | 6/2014 | Sun et al. | |
| 2014/0190195 A1 | 7/2014 | Muscatell | |
| 2014/0216102 A1 | 8/2014 | Ignatiev et al. | |
| 2014/0326018 A1* | 11/2014 | Ignatiev | F25B 49/02 62/510 |
| 2015/0176872 A1 | 6/2015 | Goenka | |
| 2015/0330673 A1 | 11/2015 | Honda et al. | |
| 2016/0010902 A1* | 1/2016 | Andres | F25B 6/04 62/236 |
| 2016/0231035 A1 | 8/2016 | Lee et al. | |
| 2016/0313057 A1 | 10/2016 | Roberts et al. | |
| 2017/0058773 A1 | 3/2017 | Vaisman | |
| 2017/0074567 A1 | 3/2017 | Ali et al. | |
| 2017/0138643 A1* | 5/2017 | Ignatiev | F25B 41/20 |
| 2017/0191727 A1 | 7/2017 | Chae et al. | |
| 2017/0198946 A1 | 7/2017 | Takenaka et al. | |
| 2017/0198950 A1 | 7/2017 | Bresson et al. | |
| 2017/0219264 A1 | 8/2017 | Song et al. | |
| 2017/0254569 A1 | 9/2017 | Kuroda | |
| 2017/0350658 A1 | 12/2017 | Kerth et al. | |
| 2017/0370639 A1 | 12/2017 | Bardon et al. | |
| 2018/0106517 A1 | 4/2018 | Baltus | |
| 2018/0147916 A1 | 5/2018 | Kolda et al. | |
| 2018/0217019 A1 | 8/2018 | Furumoto et al. | |
| 2018/0299171 A1 | 10/2018 | Olsen et al. | |
| 2018/0347861 A1 | 12/2018 | Wang et al. | |
| 2019/0011152 A1 | 1/2019 | Kniffler et al. | |
| 2019/0041102 A1* | 2/2019 | Zha | F25B 31/006 |
| 2019/0128568 A1* | 5/2019 | Scarcella | F25B 9/008 |
| 2019/0186801 A1* | 6/2019 | Kopko | F25B 49/027 |
| 2019/0242657 A1 | 8/2019 | Ignatiev et al. | |
| 2019/0264933 A1* | 8/2019 | Ignatiev | F25B 13/00 |
| 2019/0271491 A1* | 9/2019 | Sishtla | F25B 1/053 |
| 2019/0353361 A1* | 11/2019 | Attari | F24F 5/0021 |
| 2019/0353409 A1* | 11/2019 | Warner | F25B 41/20 |
| 2019/0360703 A1 | 11/2019 | Franck | |
| 2020/0003457 A1 | 1/2020 | Wallis et al. | |
| 2020/0124330 A1 | 4/2020 | Hayes | |
| 2020/0333053 A1 | 10/2020 | Hellmann et al. | |
| 2021/0048203 A1 | 2/2021 | Melink et al. | |

FOREIGN PATENT DOCUMENTS

| | | |
|---|---|---|
| CN | 1108501 C | 5/2003 |
| CN | 101517323 A | 8/2009 |
| CN | 101688698 A | 3/2010 |
| CN | 203364496 U | 12/2013 |
| CN | 203442998 U | 2/2014 |
| CN | 104471334 A | 3/2015 |
| CN | 105004087 A | 10/2015 |
| EP | 0402131 B1 | 10/1993 |
| FR | 3020130 A1 | 10/2015 |
| GB | 2017890 A | 10/1979 |
| JP | H09310894 A | 12/1997 |
| JP | 2003050059 A | 2/2003 |
| JP | 2010216783 A | 9/2010 |
| JP | 2012167869 A | 9/2012 |
| KR | 101722384 B1 | 4/2017 |
| WO | WO-2006015629 A1 | 2/2006 |
| WO | WO-2007111594 A1 | 10/2007 |
| WO | WO-2008079128 A1 | 7/2008 |
| WO | WO-2008140454 A1 | 11/2008 |
| WO | WO-2009041959 A1 | 4/2009 |
| WO | WO-2009098899 A1 | 8/2009 |
| WO | WO-2013016404 A1 | 1/2013 |

OTHER PUBLICATIONS

International Search Report regarding International Application No. PCT/US2019/039304, dated Oct. 22, 2019.

Written Opinion of the International Searching Authority regarding International Application No. PCT/US2019/039304, dated Oct. 22, 2019.

Office Action regarding U.S. Appl. No. 16/245,641, dated May 12, 2020.

Office Action regarding Chinese Patent Application No. 201680066979.X, dated May 29, 2020.

U.S. Appl. No. 16/245,641, filed Jan. 11, 2019, Kirill M. Ignatiev et al.

Clarksean, Randy, "A Phase Change Material Slurry System to Decrease Peak Air Conditioning Loads: Independent Assessment and Final EISG Report." Public Interest Energy Research, California Energy Commission, 2006 (81 pages).

Notice of Allowance regarding U.S. Appl. No. 16/412,838, dated Dec. 13, 2019.

Office Action regarding U.S. Appl. No. 16/245,641, dated Aug. 19, 2020.

Office Action regarding European Patent Application No. 14791184.6, dated Sep. 29, 2020.

Restriction Requirement regarding U.S. Appl. No. 16/447,468, dated Oct. 1, 2020.

U.S. Appl. No. 16/412,838, filed May 15, 2019, Babak Attari et al.

U.S. Appl. No. 16/447,468, filed Jun. 20, 2019, Frank S. Wallis et al.

International Search Report regarding International Application No. PCT/US2014/036592, dated Sep. 1, 2014.

Written Opinion of the International Searching Authority regarding International Application No. PCT/US2014/036592, dated Sep. 1, 2014.

Office Action regarding U.S. Appl. No. 14/267,224, dated Nov. 24, 2015.

Notice of Allowance regarding U.S. Appl. No. 14/267,224, dated Mar. 16, 2016.

Office Action regarding Chinese Patent Application No. 201480024924.3, dated Sep. 20, 2016. Translation provided by Unitalen Attorneys at Law.

Search Report regarding European Patent Application No. 14791184.6, dated Nov. 14, 2016.

International Search Report regarding International Application No. PCT/US2016/060990, dated Feb. 7, 2017.

Written Opinion of the International Searching Authority regarding International Application No. PCT/US2016/060990, dated Feb. 7, 2017.

Office Action regarding Chinese Patent Application No. 201480024924.3, dated Jun. 19, 2017. Translation provided by Unitalen Attorneys at Law.

Restriction Requirement regarding U.S. Appl. No. 15/339,012, dated Sep. 28, 2018.

Office Action regarding U.S. Appl. No. 15/339,012, dated Jan. 9, 2019.

Office Action regarding U.S. Appl. No. 15/339,012, dated Jun. 26, 2019.

Search Report regarding European Patent Application No. 16866861.4, dated Aug. 22, 2019.

International Search Report regarding International Application No. PCT/US2019/032478, dated Sep. 4, 2019.

Written Opinion of the International Searching Authority regarding International Application No. PCT/US2019/032478, dated Sep. 4, 2019.

Notice of Allowance regarding U.S. Appl. No. 15/339,012, dated Sep. 5, 2019.

International Search Report regarding Internatonal Application No. PCT/US2019/016518 dated May 21, 2019.

Written Opinion of the ISA/KR regarding International Application No. PCT/US2019/016518 dated May 21, 2019.

International Search Report of the ISA/KR regarding International Application No. PCT/US2019/019216 dated Jun. 3, 2019.

Written Opinion of the ISA/KR regarding International Application No. PCT/US2019/019216 dated Jun. 3, 2019.

Office Action regarding U.S. Appl. No. 16/245,641, dated Feb. 4, 2021.

Office Action regarding Chinese Patent Application No. 201980016759.X, dated Apr. 2, 2021. Translation provided by Unitalen Attorneys at Law.

(56) References Cited

OTHER PUBLICATIONS

Non-Final Office Action regarding U.S. Appl. No. 16/447,468 dated Aug. 5, 2021.
Non-Final Office Action regarding U.S. Appl. No. 16/245,641 dated Aug. 18, 2021.

* cited by examiner

CLIMATE-CONTROL SYSTEM WITH THERMAL STORAGE DEVICE

CROSS-REFERENCE TO RELATED APPLICATIONS

This application claims the benefit of U.S. Provisional Application No. 62/634,223, filed on Feb. 23, 2018. The entire disclosure of the above application is incorporated herein by reference.

FIELD

The present disclosure relates to a climate-control system with a thermal storage device.

BACKGROUND

This section provides background information related to the present disclosure and is not necessarily prior art.

A climate-control system such as, for example, a heat-pump system, a refrigeration system, or an air conditioning system, may include a fluid circuit having an outdoor heat exchanger, one or more indoor heat exchangers, one or more expansion devices, and one or more compressors circulating a working fluid (e.g., refrigerant or carbon dioxide) through the fluid circuit. Efficient and reliable operation of the climate-control system is desirable to ensure that the climate-control system is capable of effectively and efficiently providing a cooling and/or heating effect on demand.

SUMMARY

This section provides a general summary of the disclosure, and is not a comprehensive disclosure of its full scope or all of its features.

The present disclosure provides a climate-control system that includes a working fluid circuit and a storage tank. The working fluid circuit has a first compressor, a first heat exchanger, a second heat exchanger, a flash tank and a third heat exchanger. The first heat exchanger receives working fluid discharged from the first compressor. The flash tank is disposed downstream the first heat exchanger and includes an inlet and first and second outlets. The first outlet provides working fluid to the third heat exchanger disposed between the flash tank and the first compressor. The second outlet provides working fluid to the first compressor. The storage tank contains phase-change material that is thermally coupled with the second heat exchanger of the working fluid circuit.

In some configurations of the climate-control system of the above paragraph, the second heat exchanger is disposed within the storage tank such that the second heat exchanger is fluidly isolated from the phase-change material contained in the storage tank and in fluid communication with the first heat exchanger and the flash tank.

In some configurations of the climate-control system of either of the above paragraphs, the working fluid circuit includes a first expansion device disposed between the second heat exchanger and the first heat exchanger.

In some configurations of the climate-control system of any of the above paragraphs, the working fluid circuit includes a second expansion device disposed between the flash tank and the third heat exchanger.

In some configurations of the climate-control system of any of the above paragraphs, the working fluid circuit includes a third expansion device disposed between the flash tank and the first compressor.

In some configurations of the climate-control system of any of the above paragraphs, the climate-control system of any of the above paragraphs is operable in a charge mode and a discharge mode. In the charge mode, the third expansion device may be open to allow fluid flow through the second outlet of the flash tank to allow heat from the phase-change material in the storage tank to be transferred to working fluid in the second heat exchanger to reduce a temperature of the phase-change material. In the discharge mode, the third expansion device may be closed to restrict fluid flow through the second outlet of the flash tank to allow heat from working fluid in the second heat exchanger to be transferred the phase-change material in the storage tank.

In some configurations of the climate-control system of any of the above paragraphs, the working fluid circuit includes a first fluid passageway extending from an outlet of the first compressor and through the first heat exchanger to the second heat exchanger disposed within the storage tank; a second fluid passageway extending from the first outlet of the flash tank and through the third heat exchanger to an inlet of the first compressor; and a third fluid passageway extending from the second outlet of the flash tank to the first compressor.

In some configurations of the climate-control system of any of the above paragraphs, the flash tank includes a flash tank, and wherein the first outlet is a liquid outlet and the second outlet is a vapor outlet.

In some configurations of the climate-control system of any of the above paragraphs, the working fluid circuit includes a bypass passageway extending from the first fluid passageway at a location upstream of the first heat exchanger to a location of the first fluid passageway downstream the first heat exchanger. The bypass passageway including a valve controlling fluid-flow through the bypass passageway.

In some configurations of the climate-control system of any of the above paragraphs, the working fluid circuit includes a fourth fluid passageway extending from the third fluid passageway to a location of the first fluid passageway between the first compressor and the first heat exchanger.

In some configurations of the climate-control system of any of the above paragraphs, the fourth fluid passageway includes a second compressor.

In some configurations of the climate-control system of any of the above paragraphs, the working fluid circuit includes a low-temperature fluid passageway extending from the second fluid passageway at a location upstream of the third heat exchanger to a location of the second fluid passageway between the third heat exchanger and the first compressor.

In some configurations of the climate-control system of any of the above paragraphs, the low-temperature fluid passageway includes a third compressor, a fourth expansion device and a fourth heat exchanger.

In some configurations of the climate-control system of any of the above paragraphs, the working fluid circuit includes first and second expansion devices, the first expansion device disposed between the first heat exchanger and the flash tank, the second expansion device disposed between the flash tank and the first compressor.

In some configurations of the climate-control system of any of the above paragraphs, the working fluid circuit includes first and second valves, the first valve disposed between the second heat exchanger and the flash tank, the second valve disposed between the first compressor and the second heat exchanger.

In some configurations of the climate-control system of any of the above paragraphs, the first valve is a check valve and the second valve is a solenoid valve.

In some configurations of the climate-control system of any of the above paragraphs, the working fluid circuit includes a second compressor and a fourth heat exchanger, the second compressor receiving working fluid from the third heat exchanger and discharging working fluid into the fourth heat exchanger.

In some configurations of the climate-control system of any of the above paragraphs, the fourth heat exchanger is an interstage cooler.

In another form, the present disclosure provides a climate-control system that includes a working fluid circuit and a storage tank. The working fluid circuit has a first fluid passageway, a flash tank, a second fluid passageway, and a third fluid passageway. The first fluid passageway receives working fluid from a first compressor and includes a first heat exchanger. The flash tank includes an inlet and first and second outlets. The second fluid passageway receives working fluid from the first outlet of the flash tank and includes a third heat exchanger disposed between the flash tank and the first compressor. The third fluid passageway receives working fluid from the second outlet of the flash tank and provides working fluid to the first compressor. The storage tank contains phase-change material that is thermally coupled with a second heat exchanger of the working fluid circuit.

In some configurations of the climate-control system of the above paragraph, the second heat exchanger is disposed within the storage tank such that the second heat exchanger is fluidly isolated from the phase-change material contained in the storage tank and in fluid communication with the first heat exchanger and the flash tank.

In some configurations of the climate-control system of either of the above paragraphs, the first fluid passageway includes a first expansion device disposed upstream of the inlet of the flash tank. The second fluid passageway includes a second expansion device disposed downstream of the first outlet of the flash tank.

In some configurations of the climate-control system of any of the above paragraphs, the climate-control system of any of the above paragraphs is operable in a charge mode and a discharge mode. In the charge mode, the third expansion device may be open to allow fluid flow through the second outlet of the flash tank to allow heat from the phase-change material in the storage tank to be transferred to working fluid in the second heat exchanger to reduce a temperature of the phase-change material. In the discharge mode, the third expansion device may be closed to restrict fluid flow through the second outlet of the flash tank to allow heat from working fluid in the second heat exchanger to be transferred the phase-change material in the storage tank.

In some configurations of the climate-control system of any of the above paragraphs, the third fluid passageway includes a third expansion device disposed downstream of the second outlet of the flash tank.

In some configurations of the climate-control system of any of the above paragraphs, the working fluid circuit includes a bypass passageway extending from the first fluid passageway at a location upstream of the first heat exchanger to a location of the first fluid passageway downstream the first heat exchanger. The bypass passageway includes a valve controlling fluid-flow through the bypass passageway.

In some configurations of the climate-control system of any of the above paragraphs, the working fluid circuit includes a fourth fluid passageway extending from the third fluid passageway to a location of the first fluid passageway between the first compressor and the first heat exchanger, the fourth fluid passageway including a second compressor.

In some configurations of the climate-control system of any of the above paragraphs, the working fluid circuit includes a low-temperature fluid passageway extending from the second fluid passageway at a location upstream of the third heat exchanger to a location of the of the second fluid passageway between the third heat exchanger and the first compressor.

In some configurations of the climate-control system of any of the above paragraphs, the low-temperature fluid passageway includes a third compressor, a fourth expansion device and a fourth heat exchanger.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
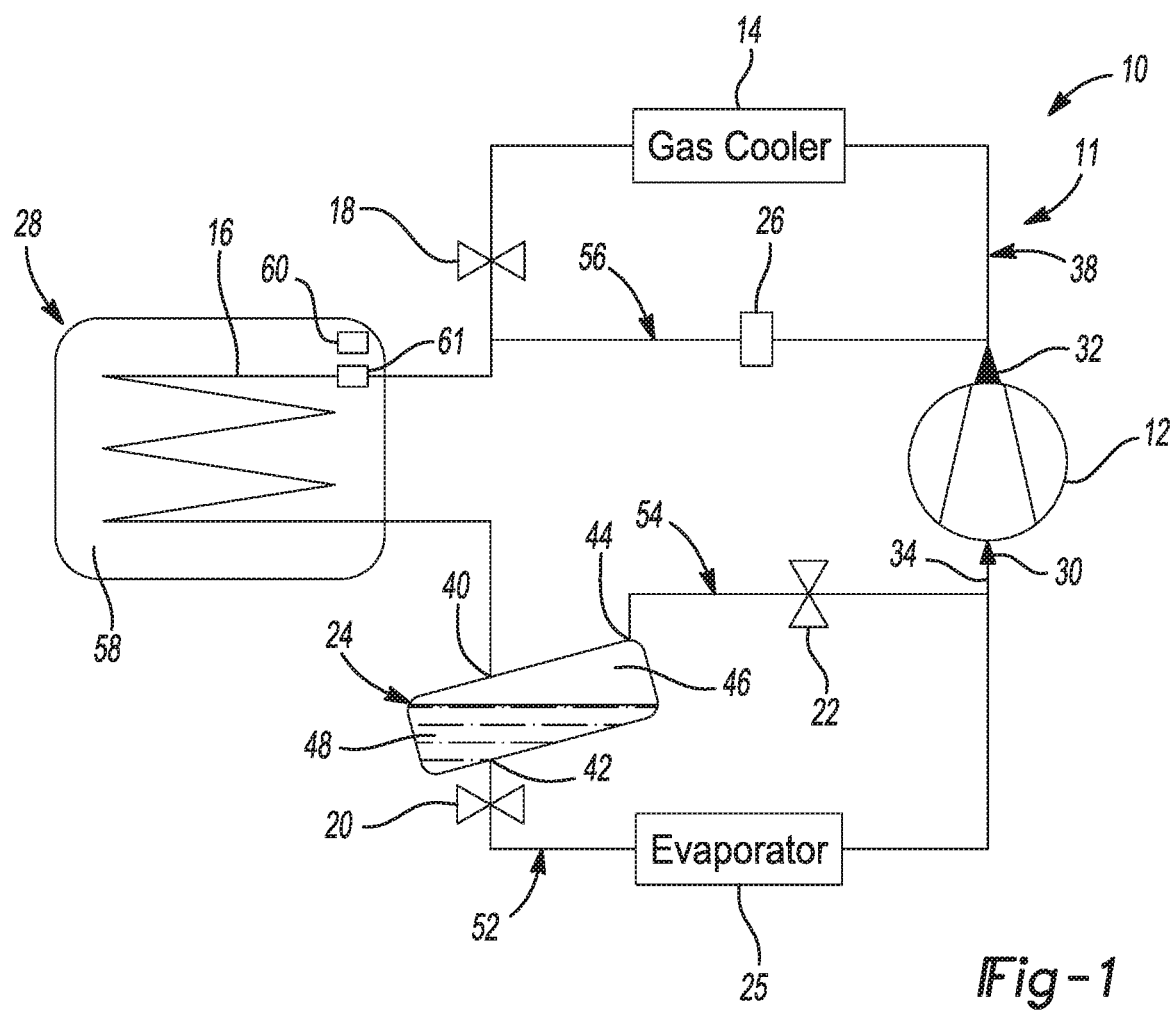
FIG. 1 is a schematic representation of a climate-control system according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a climate-control system 10 is provided that may be operable between a charge mode (i.e., ice-making mode), a discharge mode (i.e., ice-melting mode) and a charge-neutral mode. The climate-control system 10 may be a heat-pump system, a refrigeration system, and/or an air condition system, for example. The climate-control system 10 may include a fluid circuit 11 having a compressor 12, first and second heat exchangers 14, 16, first, second and third expansion devices 18, 20, 22, a flash tank 24, a third heat exchanger 25, and a bypass valve 26. The climate-control system 10 may also include a thermal storage tank 28 that is in a heat transfer relationship (i.e., thermally coupled) with the fluid circuit 11 and fluidly isolated from the fluid circuit 11.

The compressor 12 may compress and circulate a working fluid (e.g., carbon dioxide or any other refrigerant) through the fluid circuit 11 of the climate-control system 10 to heat or cool a space on demand. The compressor 12 could be a scroll compressor, for example, or any other suitable compressor such as a reciprocating or rotary vane compressor, for example. In some embodiments, the compressor 12 could be a digitally modulated scroll compressor, for example, that is operable to selectively separate its orbiting and non-orbiting scrolls (not shown) to allow partially compressed working fluid to leak out of compression pockets formed by the scrolls, thereby reducing an operating capacity of the compressor 12.

The compressor 12 may include a first inlet 30 and a first outlet 32. The first inlet 30 may receive working fluid from a suction line 34. Working fluid compressed in the compressor 12 may be discharged through the first outlet 32 to a first fluid passageway 38 that may include the first heat exchanger 14 and the first expansion device 18.

The first heat exchanger 14 may receive compressed working fluid from the first outlet 32 of the compressor 12. The first heat exchanger 14 may be a condenser or a gas-cooler and may transfer heat from the working fluid to ambient air that may be forced over the first heat exchanger 14 by a fan (not shown). In some embodiments, the first heat exchanger 14 may transfer heat from the working fluid to a stream of liquid such as water, for example.

From the first heat exchanger 14, the working fluid may flow through the first expansion device 18 (e.g., an electronic or thermal expansion valve or capillary tube). The first expansion device 18 may be disposed between the first heat exchanger 14 and the second heat exchanger 16 and may control fluid flow from the first heat exchanger 14 to the second heat exchanger 16. Working fluid downstream of the first expansion device 18 may have a lower pressure than working fluid upstream of the first expansion device 18.

From the first expansion device 18, the working fluid may flow into the second heat exchanger 16. The second heat exchanger 16 may be disposed within the storage tank 28 such that the second heat exchanger 16 is in a heat transfer relationship (i.e., thermally coupled) with the storage tank 28.

From the second heat exchanger 16, the working fluid may flow into the flash tank 24. The flash tank 24 may include an inlet 40, a first outlet 42 and a second outlet 44. Liquid and vapor working fluid may separate from each other within the flash tank 24. For example, the vapor working fluid may accumulate in an upper portion 46 of the flash tank 24 and liquid working fluid may accumulate in a lower portion 48 of the flash tank 24. In some embodiments, the flash tank 24 may be replaced with any other suitable heat exchanger operable to separate the liquid and vapor working fluid.

Liquid working fluid may exit the flash tank 24 through the first outlet 42 and flow into a second fluid passageway 52 that may include the second expansion device 20 (e.g., an electronic or thermal expansion valve or capillary tube) and the third heat exchanger 25. From the first outlet 42, the liquid working fluid may flow through the second expansion device 20. The second expansion device 20 may be disposed between the flash tank 24 and the third heat exchanger 25, and may control fluid flow from the first outlet 42 of the flash tank 24 to the third heat exchanger 25. Working fluid downstream of the second expansion device 20 may have a lower pressure than working fluid upstream of the second expansion device 20.

From the second expansion device 20, the working fluid may flow through the third heat exchanger 25. The third heat exchanger 25 may be an evaporator in which working fluid may absorb heat from a space to be cooled. From the third heat exchanger 25, the working fluid may flow into the suction line 34 and subsequently back into the compressor 12 through the first inlet 30.

Vapor working fluid may exit the flash tank 24 through the second outlet 44 and flow into a third fluid passageway 54. The third fluid passageway 54 may extend between the second outlet 44 and the suction line 34. Working fluid flowing through the third fluid passageway 54 may flow through the third expansion device 22. The third expansion device 22 may be disposed between the flash tank 24 and the compressor 12, and may control fluid flow from the second outlet 44 of the flash tank 24 to the compressor 12. Working fluid downstream of the third expansion device 22 may have a lower pressure than working fluid upstream of the third expansion device 22. The third expansion device 22 may be an electronic or thermal expansion valve or capillary tube, for example.

In some configurations, a bypass passageway 56 may extend from the first fluid passageway 38 at a location upstream of the first heat exchanger 14 (i.e., a location between the compressor 12 and the first heat exchanger 14) to a location of the first fluid passageway 38 downstream of the first heat exchanger 14 and the first expansion device 18. The bypass valve 26 may be disposed along the bypass passageway 56 and may be movable between a closed position restricting fluid flow through the bypass passageway 56 and an open position allowing fluid through the bypass passageway. When the bypass valve 26 is in the open position, at least a portion of the working fluid discharged from the compressor 12 may bypass the first heat exchanger 14 and the first expansion device 18 and flow through the bypass passageway 56 to the second heat exchanger 16. In this way, when the bypass valve 26 is in the open position, the high-pressure working fluid from the compressor 12 may flow directly to the second heat exchanger 16 where the thermal storage tank 28 cools the high-pressure working fluid. It will be appreciated that the bypass valve 26 could be a solenoid valve, a mechanical valve actuated by fluid-pressure differentials, or an electronic expansion valve, for example, or any other type of valve.

The thermal storage tank 28 may define a chamber containing phase-change material 58 such as water or glycol, for example. In some configurations, additives such as alcohol or calcium chloride ($CaCl_2$) may be mixed into the phase-change material 58 to vary (e.g., raise or lower) the temperature at which the phase-change material 58 changes phase (e.g., between solid and liquid). A first temperature sensor 60 may be attached to the thermal storage tank 28 to detect a temperature of the phase-change material 58 contained in the thermal storage tank 28 and a second temperature sensor 61 may be attached to the second heat exchanger 16 to detect a temperature of the working fluid in the second heat exchanger 16.

Figure 2:
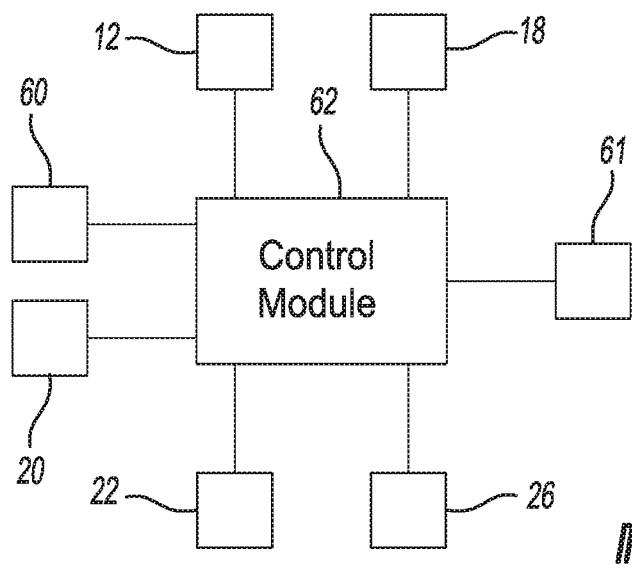
FIG. 2 is a block diagram illustrating communication between a control module and components of the climate-control system of FIG. 1.

As shown in FIG. 2, a control module 62 may be in communication with the compressor 12, the first, second and third expansion devices 18, 20 22, the bypass valve 26, and the first and second temperature sensors 60, 61. The control module 62 may control operation of the compressor 12, the first, second and third expansion devices 18, 20 22, and the bypass valve 26, for example. The operating mode of the climate-control system 10 may be at least partially based on data that the control module 62 receives from the first and second temperature sensors 60, 61. That is, the control module 62 may control the first and third expansion devices 18, 22 to operate the climate-control system 10 in the charge mode (i.e., ice-making mode), the discharge mode (i.e., ice-melting mode) and the charge-neutral mode based on data received from the first and second temperature sensors 60, 61. In some configurations, a pressure sensor (not shown) may be disposed on or in the flash tank 24 and may communicate a pressure of vapor working fluid in the upper portion 46 of the flash tank 24 to the control module 62. The control module 62 may control the third expansion device 22 based on such pressure data.

When operating the climate-control system 10 in the charge mode, the control module 62 opens the third expansion device 22 to decrease pressure in the flash tank 24 (and decrease saturated temperature measured by the second temperature sensor 61) and compares a temperature measurement received from the first temperature sensor 60 with a temperature measurement received from the second temperature sensor 61. If the temperature measurement received from the first temperature sensor 60 is equal to or lower than the temperature measurement received from the second temperature sensor 61, the control module 62 may control one or both of the first and third expansion devices 18, 22 such that the fluid-temperature of the working fluid passing through the second heat exchanger 16 is lower than the fluid-temperature of the phase-change material 58 (i.e., the temperature measurement received from the first temperature sensor 60 is higher than the temperature measurement received from the second temperature sensor 61). In this way, the working fluid passing through the second heat exchanger 16 disposed in the storage tank 28 absorbs heat from the phase-change material 58, which cools the phase-change material 58 and may turn the phase-change material into a solid (i.e., ice). The climate-control system 10 can operate to reduce the temperature of the phase-change material 58 within the thermal storage tank 28 at times (e.g., at night) when the cost of electricity is relatively low and the ambient temperature is relatively low (when operating efficiency is high). The third expansion device 22 may be controlled in a way to keep the superheat of the working fluid at the outlet of the evaporator 25 within a predetermined range. The first expansion device 18 may be controlled in a way that, in a subcritical operating mode, the subcooling of the working fluid at the outlet of the gas cooler 14 within a predetermined range. Furthermore, the first expansion device 18 may be controlled such that, in a transcritical operating mode, the pressure of the working fluid in the gas cooler 14 is maintained within a predetermined range of a value defined by a predetermined function of the temperature of the working fluid at the outlet of the gas cooler 14.

When operating the climate-control system 10 in the discharge mode, the control module 62 closes the third expansion device 22 and compares a temperature measurement received from the first temperature sensor 60 with a temperature measurement received from the second temperature sensor 61. If the temperature measurement received from the first temperature sensor 60 is equal to or higher than the temperature measurement received from the second temperature sensor 61, the control module 62 may control one or both of the first and third expansion devices 18, 22 such that the fluid-temperature of the working fluid passing through the second heat exchanger 16 is higher than the fluid-temperature of the phase-change material 58 (i.e., the temperature measurement received from the first temperature sensor 60 is lower than the temperature measurement received from the second temperature sensor 61). In this way, the working fluid passing through the second heat exchanger 16 disposed in the storage tank 28 transfers heat to the phase-change material 58, which cools the working fluid prior to the working fluid entering into the flash tank 24. The climate-control system 10 can operate to use the phase-change material 58 contained in the storage tank 28 to reduce the enthalpy of the working fluid and therefore increase cooling capacity of the system 10 at times when the cost of electricity is high (e.g., during the day) and the operating efficiency of the system 10 is relatively lower due to higher ambient temperatures.

When operating the climate-control system 10 in the charge-neutral mode, the control module 62 opens the second expansion device 20 and compares a temperature measurement received from the first temperature sensor 60 with a temperature measurement received from the second temperature sensor 61. If the temperature measurement received from the first temperature sensor 60 is lower or higher than the temperature measurement received from the second temperature sensor 61, the control module 62 may control one or both of the first and third expansion devices 18, 22 such that the fluid-temperature of the working fluid passing through the second heat exchanger 16 is equal to (or approximately equal to) the fluid-temperature of the phase-change material 58 (i.e., the temperature measurement received from the first temperature sensor 60 is equal to the temperature measurement received from the second temperature sensor 61). In this way, no net energy is transferred (i.e., charge neutral) between the working fluid and the thermal storage tank 28 as the working fluid passes through the second heat exchanger 16 and into the flash tank 24.

One of the benefits of the climate-control system 10 of the present disclosure is that the thermal storage tank 28 can be used to store the solid phase-change material 58 for use during high-electricity-cost times, thereby reducing overall cost of operating the climate-control system 10.

Figure 3:
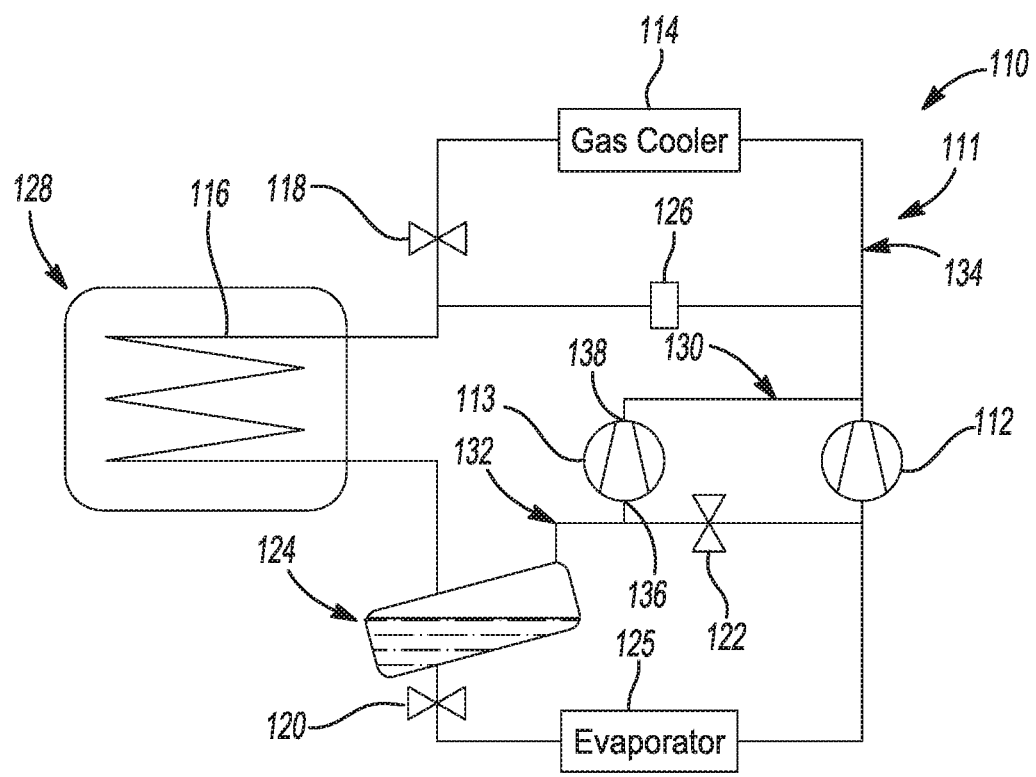
FIG. 3 is a schematic representation of another climate-control system according to the principles of the present disclosure.

With reference to FIG. 3, another climate-control system 110 is provided that may be generally similar to the climate-control system 10 described above, apart from any differences described below. The climate-control system 110 may include a fluid circuit 111 having a first compressor 112, first and second heat exchangers 114, 116, first, second and third expansion devices 118, 120, 122, a flash tank 124, a third heat exchanger 125 and a bypass valve 126. The climate-control system 110 may also include a thermal storage tank 128 that is in a heat transfer relationship (i.e., thermally coupled) with the fluid circuit 111 and fluidly isolated from the fluid circuit 111, and a control module (not shown). The structure and function of the first compressor 112, the first and second heat exchangers 114, 116, the first, second and third expansion devices 118, 120, 122, the flash tank 124, the third heat exchanger 125, the bypass valve 126, the thermal storage tank 128 and the control module (not shown) may be similar or identical to that of the compressor 12, the first and second heat exchangers 14, 16, the first, second and third expansion devices 18, 20, 22, the flash tank 24, the third heat exchanger 25, the bypass valve 26, the thermal storage tank 28 and the control module 62, respectively, described above, and therefore, will not be described again in detail.

The climate-control system 110 may also include a second compressor 113. The second compressor 113 may be disposed along a vapor recovery fluid passageway 130 that extends from a first fluid passageway 132 at a location between the flash tank 124 and the third expansion device 122 to a second fluid passageway 134 at a location between the first compressor 112 and the first heat exchanger 114. The second compressor 113 may include a first inlet 136 and a first outlet 138. Vapor working fluid may exit the flash tank 124 and into the first inlet 136 of the second compressor 113 where the vapor working fluid is compressed and discharged through the first outlet 138 to the second fluid passageway 134.

When the climate-control system 110 is in a partial charge mode (i.e., ice-making mode and providing necessary cooling), the second expansion device 120 is at least partially open such that the working fluid may flow to the third heat exchanger 125 and absorb heat from a space to be cooled. As such, a relatively large amount of liquid working fluid passing through the second heat exchanger 116 disposed in the thermal storage tank 128 may turn into vapor and accumulate in the flash tank 124. The large amount of vapor working fluid accumulated in the flash tank 124 may flow to the second compressor 113 where it is compressed and discharged to the first heat exchanger 114 via the vapor recovery fluid passageway 130 and the second fluid passageway 134. In this way, the climate-control system 110 operates more efficiently and the rate at which the climate-control system charges is increased (i.e., the rate at which phase-change material contained in the thermal storage tank 128 is cooled).

Figure 4:
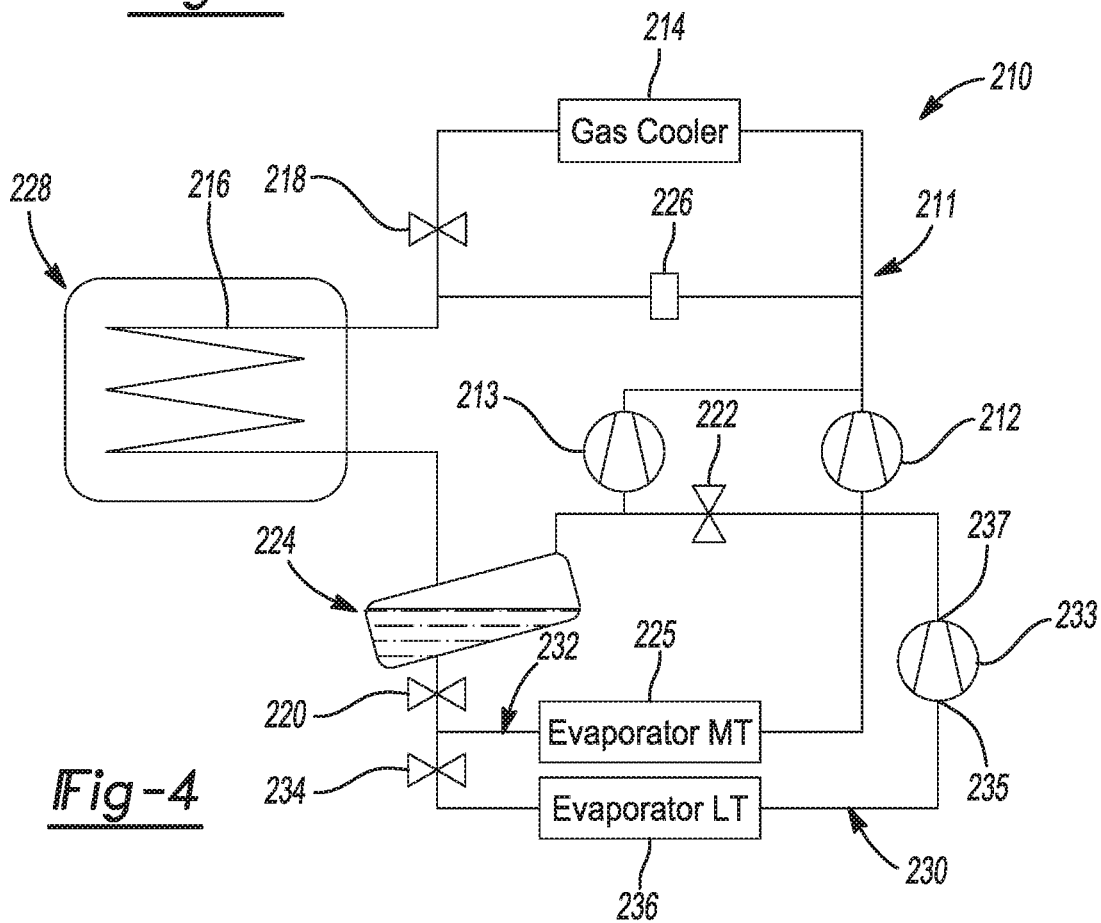
FIG. 4 is a schematic representation of yet another climate-control system according to the principles of the present disclosure.

With reference to FIG. 4, another climate-control system 210 is provided that may be generally similar to the climate-control systems 10, 110 described above, apart from any differences described below. The climate-control system 210 may include a fluid circuit 211 having first and second compressors 212, 213, first and second heat exchangers 214, 216, first, second and third expansion devices 218, 220, 222, a flash tank 224, a third heat exchanger 225 (an indoor heat exchanger such as a medium-temperature evaporator, for example), and a bypass valve 226. The climate-control system 210 may also include a thermal storage tank 228 that is in a heat transfer relationship (i.e., thermally coupled) with the fluid circuit 211 and fluidly isolated from the fluid circuit 211, and a control module (not shown). The structure and function of the first and second compressors 212 213, the first and second heat exchangers 214, 216, the first, second and third expansion devices 218, 220, 222, the flash tank 224, the third heat exchanger 225, the bypass valve 226, the thermal storage tank 228 and the control module (not shown) may be similar or identical to that of first and second compressors 112, 113, the first and second heat exchangers 114, 116, the first, second and third expansion devices 118, 120, 122, the flash tank 124, the third heat exchanger 125, the bypass valve 126, the thermal storage tank 128 and the control module 62, respectively, described above, and therefore, will not be described again in detail.

The climate-control system 210 may also include a low temperature fluid passageway 230 that extends from a medium temperature fluid passageway (or second fluid passageway) 232 at a location between the second expansion device 220 and the third heat exchanger 225 to a location of the medium temperature fluid passageway 232 between the third heat exchanger 225 and the first compressor 212. The low temperature fluid passageway 230 may also include a third compressor 233, a fourth expansion device 234 and a fourth heat exchanger 236 (an indoor heat exchanger such as a low temperature evaporator, for example).

The third compressor 233 may include a first inlet 235 and a first outlet 237. The first inlet 235 may receive working fluid from the fourth heat exchanger 236. Working fluid compressed in the third compressor 233 may be discharged through the first outlet 237 to a location along the medium temperature fluid passageway 232 that is between the third heat exchanger 225 and the first compressor 212.

The fourth expansion device 234 may be disposed between the second expansion device 220 and the fourth heat exchanger 236. The fourth expansion device 234 may be an electronic or thermal expansion valve or a capillary tube, for example. Working fluid downstream of the fourth expansion device 234 may have a lower pressure than working fluid upstream of the fourth expansion device 234.

The fourth heat exchanger 236 may selectively receive the working fluid from the flash tank 224 via the fourth expansion device 234. The working fluid in the fourth heat exchanger 236 may absorb heat from a first space to be cooled (e.g., freezer or a frozen food display case) and the third heat exchanger 225 may absorb heat from a second space to be cooled (e.g., an interior of a refrigerator, a refrigerated display case, or a cooler). In some configurations, the working fluid in the fourth heat exchanger 236 and the working fluid in the third heat exchanger 225 may absorb heat from the same space (e.g., the fourth heat exchanger 236 and the third heat exchanger 225 may operate at different times to switch the space between a freezer and a cooler, for example). From the fourth heat exchanger 236, the working fluid may flow back into the third compressor 233 through the first inlet 235.

One of the benefits of the climate-control system 210 of the present disclosure is that the thermal storage tank 228 can be used with multiple passageways each having a respective evaporator that operates at a different evaporating temperature (e.g., applications wherein the climate-control system 210 is controlling the temperatures of a cooler and a freezer).

Figure 5:
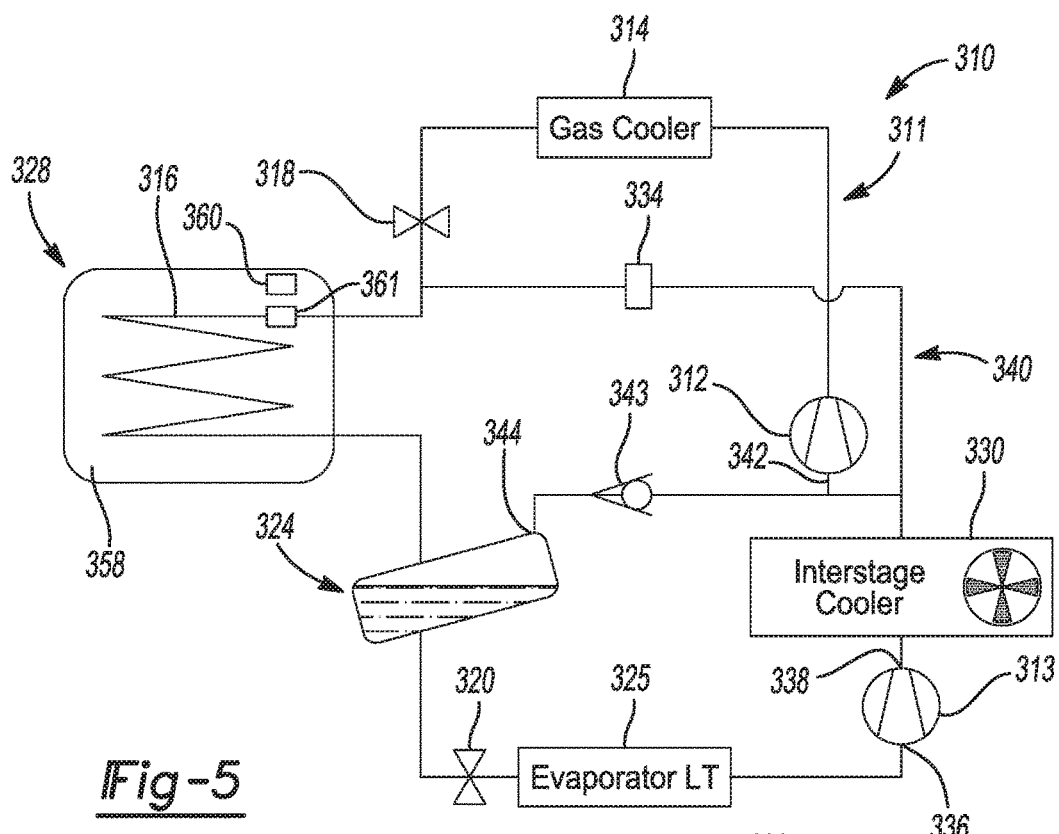
FIG. 5 is a schematic representation of yet another climate-control system according to the principles of the present disclosure.

With reference to FIG. 5, another climate-control system 310 is provided that may be generally similar to the climate-control systems 10, 110, 210 described above, apart from any differences described below. The climate-control system 310 may include a fluid circuit 311 having a first compressor 312, first and second heat exchangers 314, 316, first and second expansion devices 318, 320, a flash tank 324 and a third heat exchanger 325. The climate-control system 310 may also include a thermal storage tank 328 that is in a heat transfer relationship (i.e., thermally coupled) with the fluid circuit 311 and fluidly isolated from the fluid circuit 311, and a control module (not shown). The structure and function of the first compressor 312 may be similar or identical to that of compressors 12, 112, 212 described above, and therefore, will not be described again in detail.

The structure and function of the first heat exchanger 314 may be similar or identical to that of heat exchangers 14, 114, 214 described above, and therefore, will not be described again in detail. The structure and function of the second heat exchanger 316 may be similar or identical to that of heat exchangers 16, 116, 216 described above, and therefore, will not be described again in detail.

The structure and function of the first expansion device 318 may be similar or identical to that of expansion devices 18, 118, 218 described above, and therefore, will not be described again in detail. The structure and function of second expansion device 320 may be similar or identical to that of expansion devices 20, 120, 220 described above, and therefore, will not be described again in detail.

The structure and function of the flash tank 324 may be similar or identical to that of flash tanks 24, 124, 224 described above, and therefore, will not be described again in detail. The structure and function of the third heat exchanger 325 (an indoor heat exchanger such as a low-temperature evaporator, for example) may be similar or identical to that of heat exchangers 25, 125, 225 described above, and therefore will not be described again in detail.

The structure and function of the thermal storage tank 328 may be similar or identical to that of thermal storage tanks 28, 128, 228 described above, and therefore, will not be described again in detail. The structure and function of the control module (not shown) may be similar or identical to that of control module 62 described above, and therefore, will not be described again in detail.

The climate-control system 310 may also include a second compressor 313, a fourth heat exchanger 330, and a bypass valve 334. The second compressor 313 may be similar or identical to that of compressor 233 described above, apart from any differences described below. The second compressor 313 may include a first inlet 336 and a first outlet 338. The first inlet 336 may receive working fluid from the third heat exchanger 325. Working fluid compressed in the second compressor 313 may be discharged through the first outlet 338 to the fourth heat exchanger 330.

The fourth heat exchanger 330 may be an intercooler or interstage cooler, for example, and may cool down the compressed working fluid discharged from the second compressor 313. Working fluid exiting the fourth heat exchanger 330 may flow into either a bypass passageway 340 or the first compressor 312 (via a conduit 342) depending on the operation mode of the climate-control system 310. A check valve 343 may be disposed downstream of a second outlet 344 of the flash tank 324 to prevent backflow from the second compressor 313 into the flash tank 324.

The bypass valve 334 may be similar or identical to the bypass valve 26, described above, apart from any differences described below. The bypass valve 334 may be disposed in the bypass passageway 340 and may be movable between open and closed positions. In the closed position, the bypass valve 334 may restrict or prevent fluid-flow from the fourth heat exchanger 330 and/or the flash tank 324 to flow directly into the second heat exchanger 316. In the open position, the bypass valve 334 may allow fluid-flow from the fourth heat exchanger 330 and/or the flash tank 324 to flow directly into the second heat exchanger 316 disposed within the thermal storage tank 328. It will be appreciated that the bypass valve 334 could be a solenoid valve, a mechanical valve actuated by fluid-pressure differentials, or an electronic expansion valve, for example, or any other type of valve.

When operating the climate-control system 310 in the charge mode, the bypass valve 334 is closed and the first and second compressors 312, 313 are running. The control module (not shown) compares a temperature measurement received from a first temperature sensor 360 attached to the thermal storage tank 328 with a temperature measurement received from a second temperature sensor 361 attached to the second heat exchanger 316. If the temperature measurement received from the first temperature sensor 360 is equal to or lower than the temperature measurement received from the second temperature sensor 361, the control module (not shown) may control the capacities of one or both the first and second compressors 312, 313 such that the fluid-temperature of the working fluid passing through the second heat exchanger 316 is lower than the fluid-temperature of phase-change material 358. In this way, the working fluid passing through the second heat exchanger 316 disposed in the storage tank 328 absorbs heat from the phase-change material 358, which cools the phase-change material 358 and may turn the phase-change material 358 into a solid (i.e., ice).

When operating the climate-control system 310 in the full-discharge mode, the bypass valve 334 is open, the second compressor 313 is running and the first compressor 312 is shut-off. The control module (not shown) compares a temperature measurement received from the first temperature sensor 360 with a temperature measurement received from the second temperature sensor 361. If the temperature measurement received from the first temperature sensor 360 is equal to or higher than the temperature measurement received from the second temperature sensor 361, the control module (not shown) may control the capacity of the second compressor 313 such that the fluid-temperature of the working fluid passing through the second heat exchanger 316 is higher than the fluid-temperature of the phase-change material 358. In this way, the working fluid passing through the second heat exchanger 316 disposed in the storage tank 328 transfers heat to the phase-change material 358, which condenses the working fluid prior to the working fluid entering into the flash tank 324.

When operating the climate-control system 310 in the partial-discharge mode, the bypass valve 334 is closed and the first and second compressors 312, 313 are running. The control module (not shown) compares a temperature measurement received from the first temperature sensor 360 with a temperature measurement received from the second temperature sensor 361. If the temperature measurement received from the first temperature sensor 360 is equal to or higher than the temperature measurement received from the second temperature sensor 361, the control module (not shown) may control the capacities of one or both the first and second compressors 312, 313 such that the fluid-temperature of the working fluid passing through the second heat exchanger 316 is higher than the fluid-temperature of the phase-change material 358. In this way, the working fluid passing through the second heat exchanger 316 disposed in the storage tank 328 transfers heat to the phase-change material 358, which cools the working fluid prior to the working fluid entering into the flash tank 324.

When operating the climate-control system 310 in the charge-neutral mode, the bypass valve 334 is closed and the first and second compressors 312, 313 are running. The control module (not shown) compares a temperature measurement received from the first temperature sensor 360 with a temperature measurement received from the second temperature sensor 361. If the temperature measurement received from the first temperature sensor 360 is lower or higher than the temperature measurement received from the second temperature sensor 361, the control module (not shown) may control the capacities of one or both the first and second compressors 312, 313 such that the fluid-temperature of the working fluid passing through the second heat exchanger 316 is equal to (or approximately equal to) the fluid-temperature of the phase-change material 358. In this way, no net energy is transferred (i.e., charge neutral) between the working fluid and the thermal storage tank 328 as the working fluid passes through the second heat exchanger 316 and into the flash tank 324.

Although the first and second compressors 312, 313 are shown as a single compressor, it should be understood that each compressor 312, 313 may be replaced with a plurality of compressors connected in parallel.

Figure 6:
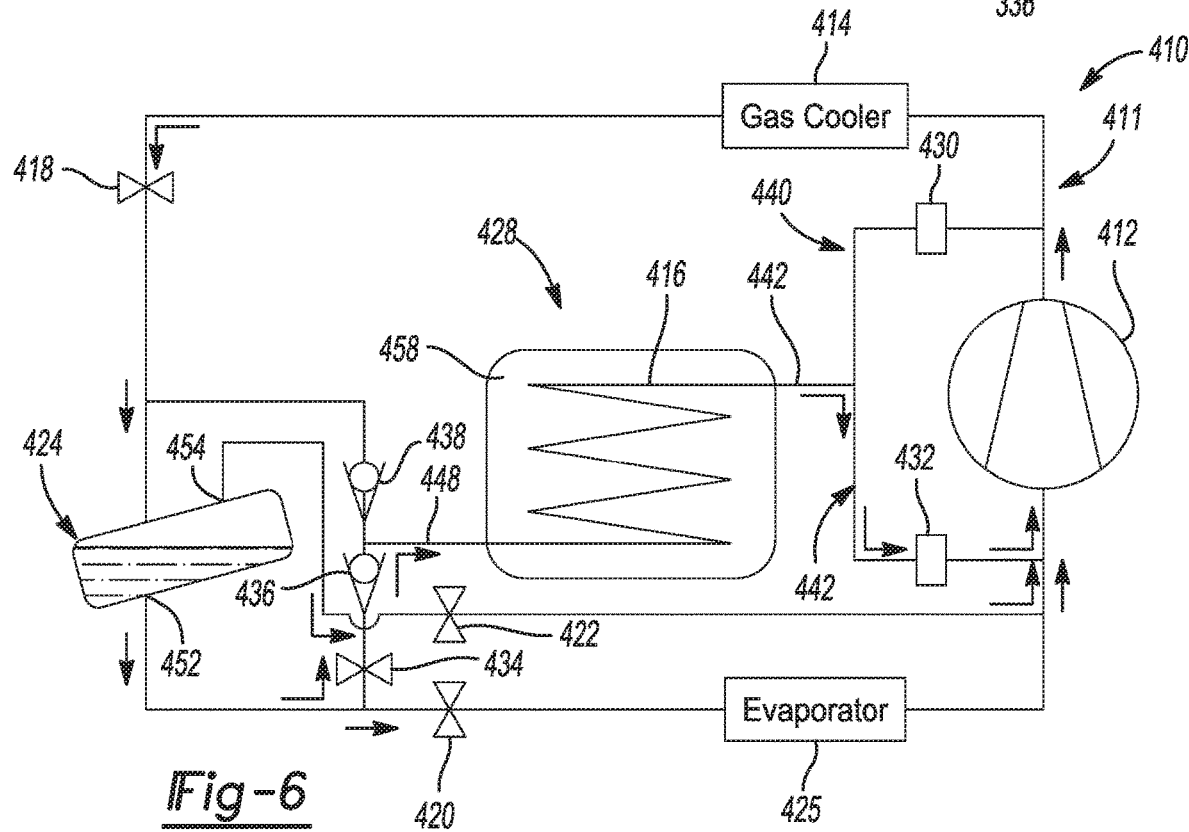
FIG. 6 is a schematic representation of yet another climate-control system according to the principles of the present disclosure.
Figure 7:
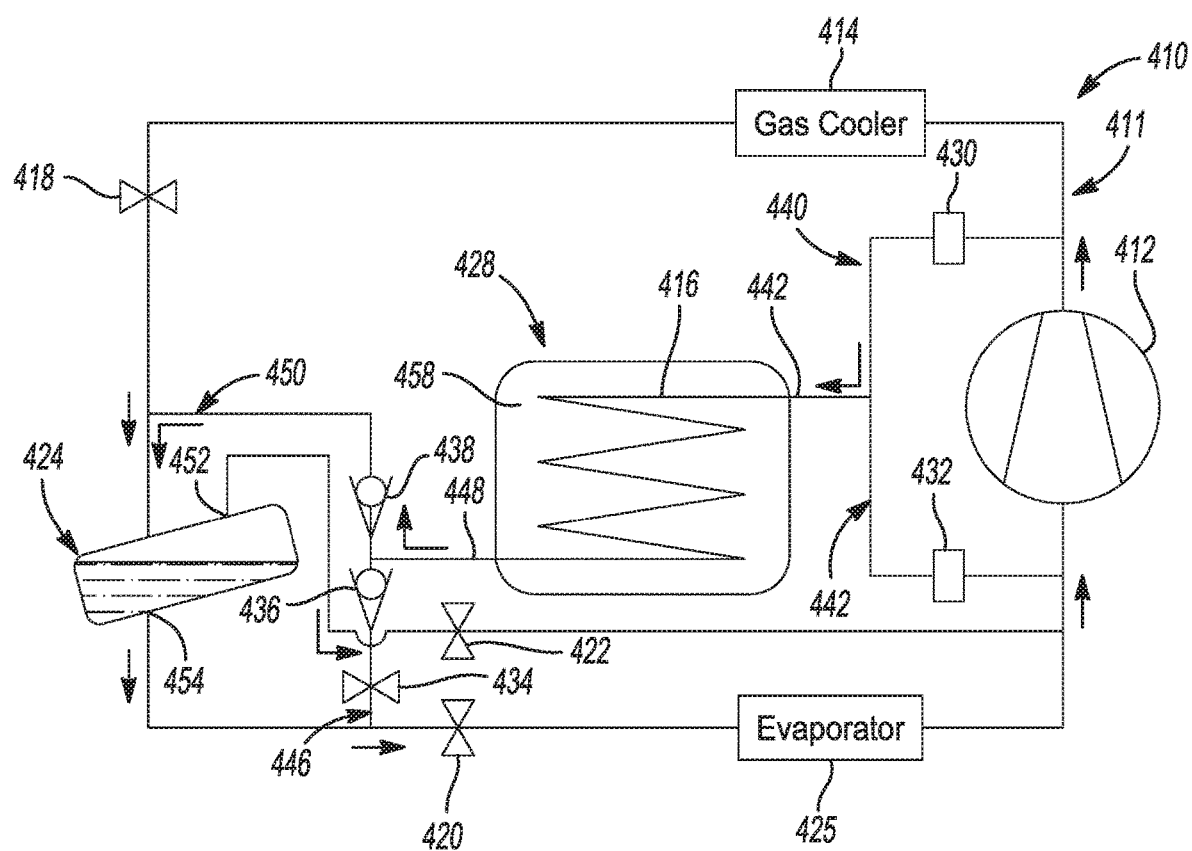
FIG. 7 is a schematic representation of yet another climate-control system according to the principles of the present disclosure.

With reference to FIGS. 6 and 7, another climate-control system 410 is provided that may be generally similar to the climate-control systems 10, 110, 210, 310 described above, apart from any differences described below. The climate-control system 410 may include a fluid circuit 411 having a compressor 412, first and second heat exchangers 414, 416, first, second and third expansion devices, 418, 420, 422, a flash tank 424 and a third heat exchanger 425. The climate-control system 410 may also include a thermal storage tank 428 that is in a heat transfer relationship (i.e., thermally coupled) with the fluid circuit 411 and fluidly isolated from the fluid circuit 411. The structure and function of the compressor 412 may be similar or identical to that of compressors 12, 112, 212, 312 described above, and therefore, will not be described again in detail. The structure and function of the first heat exchanger 414 may be similar or identical to that of heat exchangers 14, 114, 214, 314 described above, and therefore, will not be described again in detail.

The structure and function of the second heat exchanger 416 may be similar or identical to that of heat exchangers 16, 116, 216, 316 described above, apart from any differences described below.

The structure and function of the first expansion device 418 may be similar or identical to that of expansion devices 18, 118, 218, 318 described above, apart from any differences described below. The first expansion device 418 may be disposed between the first heat exchanger 414 and the flash tank 424 and may control fluid flow from the first heat exchanger 414 to the flash tank 424. Working fluid downstream of the first expansion device 418 may have a lower pressure than working fluid upstream of the first expansion device 418.

The structure and function of the second expansion device 420 may be similar or identical to that of expansion devices 20, 120, 220, 320 described above, and therefore, will not be described again in detail. The structure and function of the third expansion device 422 may be similar or identical to that of expansion devices 22, 122, 222, 322 described above, and therefore, will not be described again in detail. The structure and function of the flash tank 424 may be similar or identical to that of flash tanks 24, 124, 224, 324 described above, and therefore, will not be described again in detail.

The structure and function of the third heat exchanger 425 may be similar or identical to that of heat exchangers 25, 125, 225, 325 described above, and therefore, will not be described again in detail. The structure and function of the thermal storage tank 428 may be similar or identical to that of thermal storage tanks 28, 128, 228, 328 described above, and therefore, will not be described again in detail.

The climate-control system 410 may also include a first control valve 430, a second control valve 432, a fourth expansion device 434 and first and second check valves 436, 438. The first control valve 430 may be movable between an open position (FIG. 7) and a closed position (FIG. 6) and may be disposed at a first fluid passageway 440 that extends from a location between the compressor 412 and the first heat exchanger 414 to the second heat exchanger 416 (via a conduit 442). It will be appreciated that the first control valve 430 could be a solenoid valve, a mechanical valve actuated by fluid-pressure differentials, or an electronic expansion valve, for example, or any other type of valve.

The second control valve 432 may be movable between an open position (FIG. 6) and a closed position (FIG. 7) and may be disposed at a second fluid passageway 444 that extends from the second heat exchanger 416 (via the conduit 442) to a location between the compressor 412 and the third heat exchanger 425. It will be appreciated that the second control valve 432 could be a solenoid valve, a mechanical valve actuated by fluid-pressure differentials, or an electronic expansion valve, for example, or any other type of valve.

The fourth expansion device 434 (e.g. an expansion valve or capillary tube) may be disposed at a third fluid passageway 446 that extends from a location between the flash tank 424 and the second expansion device 420 to the second heat exchanger 416 (via a conduit 448). The fourth expansion device 434 may control fluid flow from the flash tank 424 to the second heat exchanger 416. Working fluid downstream of the fourth expansion device 434 may have a lower pressure than working fluid upstream of the fourth expansion device 434.

The first check valve 436 may be movable between an open position (FIG. 6) and a closed position (FIG. 7) and may be disposed at the third fluid passageway 446 downstream of the fourth expansion device 434. The second check valve 438 may be movable between an open position (FIG. 7) and a closed position (FIG. 6) and may be disposed at a fourth fluid passageway 450 that extends from the second heat exchanger 416 (via the conduit 448) to a location between the flash tank 424 and the first expansion device 418.

With continued reference to FIGS. 6 and 7, operation of the climate-control system 410 in the charge mode (i.e., ice-making mode) and the discharge mode (i.e., ice-melting mode) will now be described in detail. In the charge mode (as shown in FIG. 6), the first control valve 430 and the second check valve 438 are in the closed position, and the second control valve 432 and the first check valve 436 are in the open position. The working fluid is compressed in the compressor 412 and discharged to the first heat exchanger 414 where the high-pressure working fluid is cooled by transferring heat from the working fluid to ambient air or another cooling medium (e.g., water). From the first heat exchanger 414, the working fluid flows through the first expansion device 418, thereby lowering the temperature and pressure of the working fluid prior to flowing into the flash tank 424.

In the flash tank 424, liquid working fluid is separated from vapor working fluid. Liquid working fluid may exit the flash tank 424 through a liquid outlet 452. Vapor working fluid may exit the flash tank through a vapor outlet 454. From the liquid outlet 452, a first portion of the working fluid may flow through the second expansion device 420 to further lower its temperature and pressure to the third heat exchanger 425 in which the working fluid may absorb heat from a space to be cooled. From the third heat exchanger 425, the working fluid may flow back into the compressor 412.

A second portion of the working fluid exiting the liquid outlet 452 may flow through the fourth expansion device 434 disposed at the third fluid passageway 446. Flowing through the fourth expansion device 434 lowers the temperature and pressure of the working fluid. Upon exiting the fourth expansion device 434, the working fluid may flow through the first check valve 436 and into the second heat exchanger 416 (via the conduit 448). The working fluid may not experience any significant change in its state or properties when flowing through the first check valve 436. Due to the second check valve 438 being in the closed position, the working fluid is prevented from flow through the fourth fluid passageway 450. The second heat exchanger 416 and the thermal storage tank 428 are arranged in parallel with the third heat exchanger 425. The working fluid passing through the second heat exchanger 416 disposed in the storage tank 428 absorbs heat from phase-change material 458, which cools the phase-change material 458 and may turn the phase-change material 458 into a solid (i.e., ice). The climate-control system 410 can operate to reduce the temperature of the phase-change material 458 within the thermal storage tank 428 at times when the cost of electricity is low (e.g., at night). From the second heat exchanger 416, the working fluid flows through the conduit 442 and the second control valve 432 and back into the compressor 412.

From the vapor outlet 454 of the flash tank 424, the vapor working fluid can flow through the third expansion device 422 to lower its temperature and pressure before flowing back into the compressor 412.

In the discharge mode (as shown in FIG. 7), the second control valve 432 and the first check valve 436 are in the closed position, and the first control valve 430 and the second check valve 438 are in the open position. The working fluid is compressed in the compressor 412 and discharged through the first control valve 430 and the conduit 442 to the second heat exchanger 416 disposed in the thermal storage tank 428. The phase-change material 458 contained in the thermal storage tank 428 condenses the high-pressure working fluid flowing through the second heat exchanger 416, which cools (i.e., reduces the temperature) the working fluid. The climate-control system 410 can operate to use the phase-change material 458 contained in the storage tank 428 to reduce the temperature of the working fluid at times when the cost of electricity is high (e.g., during the day).

From the second heat exchanger 416, the working fluid flows through the second check valve 438 and into the flash tank 424. Due to the first check valve 436 being in the closed position, the working fluid is prevented from flow through the third fluid passageway 446.

In the flash tank 424, liquid working fluid is separated from vapor working fluid. Liquid working fluid may exit the flash tank 424 through the liquid outlet 452. Vapor working fluid may exit the flash tank through the vapor outlet 454. From the liquid outlet 452, the working fluid may flow through the second expansion device 420 to lower its temperature and pressure to the third heat exchanger 425 in which the working fluid may absorb heat from a space to be cooled. Due to the first check valve 436 being in the closed position, the working fluid is prevented from flow through the third fluid passageway 446. From the third heat exchanger 425, the working fluid may flow back into the compressor 412.

From the vapor outlet 454 of the flash tank 424, the vapor working fluid can flow through the third expansion device 422 to lower its temperature and pressure before flowing back into the compressor 412.

In this application, the term "module" may be replaced with the term circuit. The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112 (f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A climate-control system comprising:
a working fluid circuit having a first compressor, a first heat exchanger, a second heat exchanger, a flash tank, and a third heat exchanger, the first heat exchanger receiving working fluid discharged from the first compressor, the flash tank disposed downstream of the first heat exchanger and including an inlet and first and second outlets, the first outlet providing working fluid to the third heat exchanger disposed between the flash tank and the first compressor, the second outlet providing working fluid to the first compressor; and
a storage tank containing phase-change material, the phase-change material thermally coupled with the second heat exchanger of the working fluid circuit,
wherein the working fluid circuit includes an expansion device disposed between the flash tank and the first compressor,
wherein the climate-control system is operable in a charge mode and a discharge mode,
wherein in the charge mode, the expansion device is open to allow fluid flow through the second outlet of the flash tank to allow heat from the phase-change material in the storage tank to be transferred to working fluid in the second heat exchanger to reduce a temperature of the phase-change material, and
wherein in the discharge mode, the expansion device is closed to restrict fluid flow through the second outlet of the flash tank to allow heat from working fluid in the second heat exchanger to be transferred to the phase-change material in the storage tank.

2. The climate-control system of claim 1, wherein the working fluid circuit includes:

a first fluid passageway extending from an outlet of the first compressor and through the first heat exchanger to the second heat exchanger disposed within the storage tank;
a second fluid passageway extending from the first outlet of the flash tank and through the third heat exchanger to an inlet of the first compressor; and
a third fluid passageway extending from the second outlet of the flash tank to the first compressor.

3. The climate-control system of claim 2, wherein the first outlet of the flash tank is a liquid outlet and the second outlet of the flash tank is a vapor outlet.

4. The climate-control system of claim 1, wherein the second heat exchanger is disposed within the storage tank such that the second heat exchanger is fluidly isolated from the phase-change material contained in the storage tank and in fluid communication with the first heat exchanger and the flash tank.

5. The climate-control system of claim 4, wherein the working fluid circuit includes another expansion device disposed between the second heat exchanger and the first heat exchanger.

6. The climate-control system of claim 5, wherein the working fluid circuit includes another expansion device disposed between the flash tank and the third heat exchanger.

7. The climate-control system of claim 4, wherein the working fluid circuit includes a second compressor and a fourth heat exchanger, the second compressor receiving working fluid from the third heat exchanger and discharging working fluid into the fourth heat exchanger.

8. The climate-control system of claim 7, wherein the fourth heat exchanger is an interstage cooler.

9. The climate-control system of claim 4, wherein the working fluid circuit includes another expansion device disposed between the first heat exchanger and the flash tank and another expansion device disposed between the flash tank and the first compressor.

10. The climate-control system of claim 9, wherein the working fluid circuit includes first and second valves, the first valve disposed between the second heat exchanger and the flash tank, the second valve disposed between the first compressor and the second heat exchanger.

11. The climate-control system of claim 10, wherein the first valve is a check valve and the second valve is a solenoid valve.

12. A climate-control system comprising:
a working fluid circuit having a first compressor, a first heat exchanger, a second heat exchanger, a flash tank, and a third heat exchanger, the first heat exchanger receiving working fluid discharged from the first compressor, the flash tank disposed downstream of the first heat exchanger and including an inlet and first and second outlets, the first outlet providing working fluid to the third heat exchanger disposed between the flash tank and the first compressor, the second outlet providing working fluid to the first compressor; and
a storage tank containing phase-change material, the phase-change material thermally coupled with the second heat exchanger of the working fluid circuit,
wherein the working fluid circuit includes:
a first fluid passageway extending from an outlet of the first compressor and through the first heat exchanger to the second heat exchanger disposed within the storage tank;
a second fluid passageway extending from the first outlet of the flash tank and through the third heat exchanger to an inlet of the first compressor;
a third fluid passageway extending from the second outlet of the flash tank to the first compressor; and
a bypass passageway extending from the first fluid passageway at a location upstream of the first heat exchanger to a location of the first fluid passageway downstream the first heat exchanger, the bypass passageway including a valve controlling fluid-flow through the bypass passageway.

13. The climate-control system of claim 12, wherein the working fluid circuit includes a fourth fluid passageway extending from the third fluid passageway to a location of the first fluid passageway between the first compressor and the first heat exchanger.

14. The climate-control system of claim 13, wherein the fourth fluid passageway includes a second compressor.

15. The climate-control system of claim 14, wherein the working fluid circuit includes a low-temperature fluid passageway extending from the second fluid passageway at a location upstream of the third heat exchanger to a location of the second fluid passageway between the third heat exchanger and the first compressor.

16. The climate-control system of claim 15, wherein the low-temperature fluid passageway includes a third compressor, a fourth expansion device and a fourth heat exchanger.

17. A climate-control system comprising:
a working fluid circuit having a first fluid passageway, a flash tank, a second fluid passageway, and a third fluid passageway, the first fluid passageway receiving working fluid from a first compressor and including a first heat exchanger, the flash tank including an inlet and first and second outlets, the second fluid passageway receiving working fluid from the first outlet of the flash tank and including a third heat exchanger disposed between the flash tank and the first compressor, the third fluid passageway receiving working fluid from the second outlet of the flash tank and providing working fluid to the first compressor; and
a storage tank containing phase-change material, the phase-change material thermally coupled with a second heat exchanger of the working fluid circuit,
wherein the second heat exchanger is disposed within the storage tank such that the second heat exchanger is fluidly isolated from the phase-change material contained in the storage tank and in fluid communication with the first heat exchanger and the flash tank,
wherein the third fluid passageway includes a third expansion device disposed downstream of the second outlet of the flash tank,
wherein the climate-control system is operable in a charge mode and a discharge mode,
wherein in the charge mode, the third expansion device is open to allow fluid flow through the second outlet of the flash tank to allow heat from the phase-change material in the storage tank to be transferred to working fluid in the second heat exchanger to reduce a temperature of the phase-change material, and
wherein in the discharge mode, the third expansion device is closed to restrict fluid flow through the second outlet of the flash tank to allow heat from working fluid in the second heat exchanger to be transferred to the phase-change material in the storage tank.

18. The climate-control system of claim 17, wherein the working fluid circuit includes a bypass passageway extending from the first fluid passageway at a location upstream of the first heat exchanger to a location of the first fluid passageway downstream the first heat exchanger, the bypass passageway including a valve controlling fluid-flow through the bypass passageway.

19. The climate-control system of claim 18, wherein the working fluid circuit includes a fourth fluid passageway extending from the third fluid passageway to a location of the first fluid passageway between the first compressor and the first heat exchanger, the fourth fluid passageway including a second compressor.

20. The climate-control system of claim 19, wherein the working fluid circuit includes a low-temperature fluid passageway extending from the second fluid passageway at a location upstream of the third heat exchanger to a location of the of the second fluid passageway between the third heat exchanger and the first compressor.

21. The climate-control system of claim 20, wherein the low-temperature fluid passageway includes a third compressor, a fourth expansion device and a fourth heat exchanger.

* * * * *